United States Patent [19]
Eschlboeck et al.

[11] Patent Number: 5,178,059
[45] Date of Patent: Jan. 12, 1993

[54] APPARATUS FOR PREPARING FOOD PRODUCTS

[76] Inventors: Manfred Eschlboeck, Leonfeldnerstrasse 90, A-4040, Linz, Austria; Dieter W. Schauer, Gstoettnerhofstrasse 14, A-4040, Linz, Austria

[21] Appl. No.: 722,121

[22] Filed: Jun. 27, 1991

[30] Foreign Application Priority Data

Sep. 20, 1990 [AT] Austria ............................ 1909/90

[51] Int. Cl.[5] .................................... A47J 37/06
[52] U.S. Cl. ........................... 99/349; 99/419; 99/403
[58] Field of Search ............ 99/349, 351, 353, 417, 99/419, 421 R, 427, 423, 369, 372, 377, 447, 403; 100/266, 268

[56] References Cited

U.S. PATENT DOCUMENTS

| | | | |
|---|---|---|---|
| 917,517 | 4/1909 | Altman | 99/419 |
| 1,202,637 | 10/1916 | Adelmann | 99/419 |
| 1,431,234 | 10/1922 | Jones | 99/419 |
| 2,244,145 | 6/1941 | Erickson | 99/349 |
| 2,584,295 | 2/1952 | Sanzenbacher | 99/419 |
| 2,720,157 | 10/1955 | Harrison | 99/349 |
| 3,648,600 | 3/1972 | Jaccard | 100/268 |
| 3,996,847 | 12/1976 | Reed | 99/419 |
| 4,217,817 | 8/1980 | Meamber | 99/349 |
| 4,224,864 | 9/1980 | Wendell | 100/266 |
| 4,257,321 | 3/1981 | Wheeler et al. | 100/268 |
| 4,261,258 | 4/1981 | Reed | 99/404 |
| 4,315,950 | 2/1982 | Reed | 426/509 |
| 4,446,775 | 5/1984 | Reed | 99/353 |
| 4,498,376 | 2/1985 | Carey | 99/345 |
| 4,539,900 | 9/1985 | Reed | 99/353 |
| 4,763,571 | 8/1988 | Bergling et al. | 99/349 |
| 4,913,040 | 4/1990 | Sherman et al. | 99/349 |

FOREIGN PATENT DOCUMENTS

| | | | |
|---|---|---|---|
| 416276 | 5/1928 | Fed. Rep. of Germany | 99/419 |
| 281153 | 12/1927 | United Kingdom | 99/419 |

Primary Examiner—Harvey C. Hornsby
Assistant Examiner—Reginald Alexander

[57] ABSTRACT

Apparatus for cooking food products comprising a container capable of holding a liquid and having a pivotable cover attached thereto, a bottom plate mounted in the container and having a plurality of tines extending upwardly therefrom, a food product holding plate resiliently mounted over the bottom plate and having a plurality of openings therein which mate with the plurality of tines, and a pressure plate mounted on said cover such that when said cover is in its closed position the pressing plate will depress the food holding plate a distance sufficient to permit the plurality of tines to pass through the plurality of holes for a determined distance.

4 Claims, 2 Drawing Sheets

APPARATUS FOR PREPARING FOOD PRODUCTS

BACKGROUND OF THE INVENTION

The invention refers to an apparatus for cooking food, especially meat and fish, with a container which may be heated and which has a pivotable cover that can be opened and closed. This container contains a garnishing liquid and plates (a bottom plate with tines and plate thereabove with mating openings) whereby the plate with openings serves as a tray-plate for the food products to be grilled/cooked.

Present cooking apparatus have basket-like inserts, which can be put into a container whereby the hot cooking liquid in those containers or its steam will treat and cook the food. As cooking liquids, oil, soups, garnishing liquids and the like as well as salty water can be used and dependent upon these liquids the food products are fried, boiled, or steamed which provides a certain taste according to the way they are cooked. Further, there are various grilling apparatus where the meat is set on a rack and thereby exposed to the heat, such as smoke of fire or any other source of heat. Thereby an effect of roasting or toasting is achieved which provides the characteristic taste of grilling.

SUMMARY OF THE INVENTION

This invention now provides a grilling/cooking apparatus of the above mentioned type, which permits a very special grilling/cooking method that allows within a very short time of food treatment the preparation of a variety of very tasty, juicy and spicy food products.

Briefly stated, the present invention comprises apparatus for cooking food products comprising a container capable of holding a liquid and having a pivotable cover, a bottom plate mounted in said container and having a plurality of tines extending upwardly therefrom, a food product holding plate resiliently mounted over said bottom plate and having a plurality of openings therein which mate with said plurality of tines, and a pressing plate mounted on said cover such that when said cover is in its closed position said pressure plate will depress said food holding plate a distance sufficient to permit said plurality of tines to pass through said plurality of holes for a determined distance.

DETAILED DESCRIPTION

Figure 1:
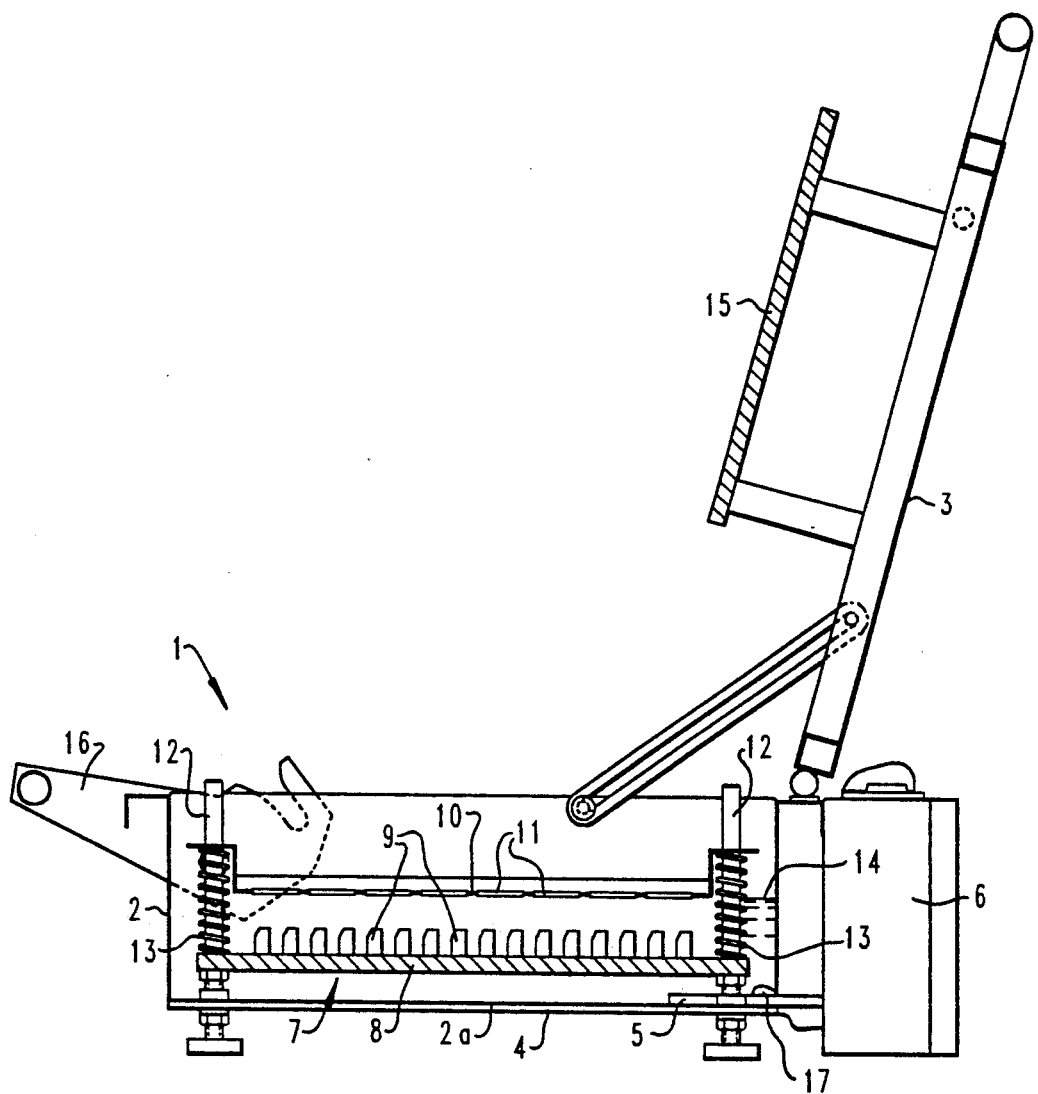
FIG. 1 is a side view, partially in section, of the apparatus of the present invention.

Referring to FIG. 1 of the drawings, there is shown apparatus 1 comprising container 2 capable of holding a cooking liquid having a pivotable cover 3; made pivotable by being hinged to an end of container 2. Means to heat liquid in the container, preferably a conventional heating blanket 4, is attached at the bottom 2a of container 2 and a temperature sensor, preferably a thermostat 5, is also mounted in container 2 to control the temperature of the liquid. Conventional electric control means (not shown) are mounted in box 6 and are operatively connected to thermostat 5 and heating blanket 4 to switch heating blanket 4 on an off as needed to maintain the desired cooking temperature. Also not shown are the conventional wire connecting the electric control to a source of electricity and the conventional dials for setting the desired temperature and cooking times and accompanying control signals.

Container 2 holds preparation unit 7 which consists of bottom plate 8 having a plurality of tines 9 as well as food product holding plate 10 with a plurality of holes 11 which mate with tines 9. Plate 10 is mounted onto corner posts 12 on the plate 8 whereby springs 13 around these corner posts help make plate resilient; i.e. capable of moving move up and down on corner posts 12. Due to this movable or resiliant feature of plate 10, when cover 3 is in the "open" position, plate 10 is situated above the plate 8 and is above the level plate 8.

Figure 3:
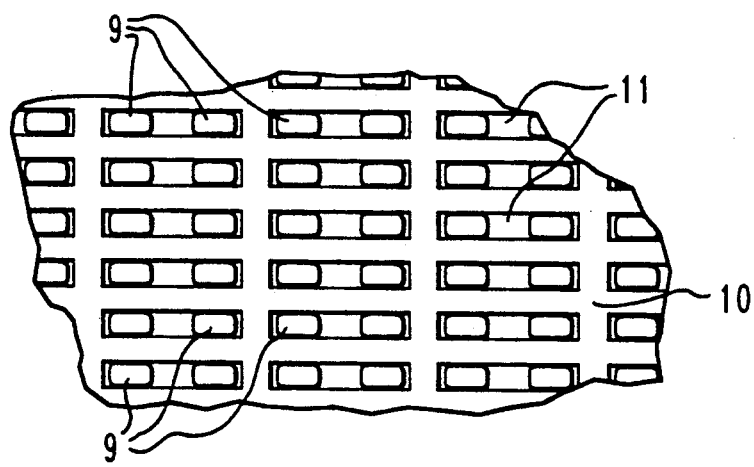
FIG. 3 is a partial plan view of food holding plate 10 FIG. 1.

Cover 3 carries a pressing plate 15 which extends into container 2 when cover 3 is put into its "closed" position. Pressing plate 15 moves plate 10 downwardly by the pressure thereon and on springs 13 into the garnishing liquid 14 and in which position plate 10 is on top of the plate 8 with its tines 9 rising through mating openings 11 of plate 10. A locking mechanism 16 for the cover 3 keeps cover 3 in its closed position. FIG. 3 shows the relationship between tines 9 and openings 11.

Figure 2:
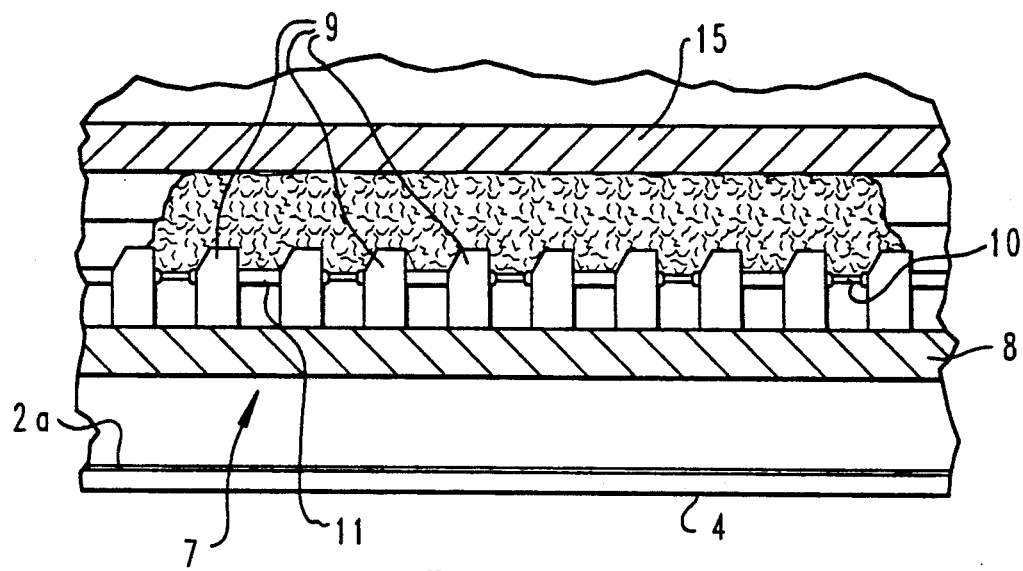
FIG. 2 is a partial sectional view of the apparatus in its cooking mode with a food product therein.

To prepare food with this apparatus, for example meat, fish or even vegetables or the like, the container 2 is filled to the liquid-filling height 14 with a garnishing liquid and the heating blanket 4 switched on until the desired cooking temperature is reached, for example about 204° Fahrenheit for the garnishing liquid. The cover 3 is opened and the food product placed onto plate 10 which springs 13 maintain above the garnishing liquid level 14. By closing cover 3, pressing plate 15 presses the food product together with the plate 10 down to the grilling/cooking position, in which the food product is completely surrounded by the garnishing liquid and the tines 9 of the ground plate 8 penetrate through the openings 11 and into the food product. This is best shown in FIG. 2 As the plate 8 with the tines 9 is always in the garnishing liquid and as such has the same temperature as the garnishing liquid, the grilling/cooking temperature is not only transferred by the garnishing liquid onto and into the food product from outside but also from inside by the penetrating tines 9 and plate 8 and as such the food product is heated rapidly over a large extended area, so that a rapid grilling/cooking is made possible. By pressing the food product onto tines 9 an additional tenderizing effect is achieved, in addition to the intensive heat treatment by the garnishing liquid. After about 20-30 seconds the grilling/cooking is finished which can be signaled by a timer on electric switch board 6 and the food product(s) can be taken out from the apparatus. For this purpose the locking mechanism 16 is released and the cover 3 opened, whereby the plate 10 and the food product being placed on top of it are again moved back upward by the springs 13 above the garnishing liquid level in the "starting position" and the food product can easily be taken out of the cooking apparatus.

As the entire preparation unit 7 can easily be taken out of the container and also easily be disassembled there are no difficulties when cleaning the apparatus whereby a drainage-valve 17 for the garnishing liquid allows draining the liquid without moving the apparatus. Thereby there is provided a small and handsome, easy to operate and simple apparatus for grilling/cooking which allows the efficient preparation of delicious and well tasting food products.

By having the hot garnishing liquid surrounding and penetrating the food product, heat is applied over a large surface and directly transferred onto and into the food product, which will be grilled/cooked quickly and without losing moisture. The numerous tines 9 which are penetrating the food product further eliminate a shrinking of the food and simultaneously allow the garnishing liquid to treat the food product intensively. Therefore, despite the rapid grilling/cooking the food product becomes tender and can get the desired spicing, a spicing which is provided not only by the spicing treatment of the food product before cooking, but also by spicing the respectively prepared garnishing liquid. The heatable container provides the necessary warming up of the garnishing liquid and also the even warming of plate 8 and tines 9, as those are inside and surrounded by the garnishing liquid. After the grilling/cooking one only need to open the cover and the cooked food product can be removed conveniently from plate 10 in its upmost position. Use of a locking mechanism for the cover facilitates the pressing of plate 10 onto plate 8 as well as the pressing the food product onto and into the tines 9. Having a lock for the apparatus keeps plate 10 in place without further manual assistance, in the grilling-/cooking position as it presses the food product onto the plate 8 and tines 9.

A very simple construction is achieved if corner posts 12 are used on the plate 8, onto which plate 10 can simply be fit over springs 13. Thereby, the moving up and down of plate 10 is achieved easily as well as the whole preparation/grilling/cooking unit inside the container consists of readily disassembled parts providing an easy and simple cleaning after use.

By equipping the apparatus with a heating blanket at the bottom of container 2 and a sensor for temperature, the apparatus can be operated with optimum energy efficiency as the heating can be transferred over a large area and the temperature can be carefully controlled by the sensor.

As garnishing liquids there can be used oils, soups, water or the like. Recommended, however, as a garnishing liquid is one containing some seasoning, such as spices and herbs as the taste of that seasoning has a special impact on the preparation of the food product and gives a special taste to it.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. Apparatus for cooking food products comprising a container having a bottom and sides capable of holding a cooking liquid and having a pivotable cover attached thereto, a bottom plate fixedly mounted in said container above the bottom thereof and away from the sides thereof thereby permitting said bottom plate to be entirely immersed in said cooking liquid and having a plurality of tines extending upwardly therefrom, a food product holding plate resiliently mounted over said bottom plate and having a plurality of openings therein which mate with said plurality of tines, and a pressure plate rigidly mounted on said cover such that when said cover is in its closed position said pressing plate will depress said food holding plate a distance sufficient to permit said plurality of tines to pass through said plurality of holes for a determined distance.

2. The apparatus of claim 1 including a liquid in said container and means to heat said liquid.

3. The apparatus of claim 1 or 2 wherein said bottom plate has at least two posts onto which said food product holding plate is mounted, each of said posts having resilient springs mounted thereover between said bottom plate and said bottom plate and said food product holding plate.

4. The apparatus of claim 1 or 2 including a temperature monitoring means mounted in said container.

* * * * *

UNITED STATES PATENT AND TRADEMARK OFFICE
CERTIFICATE OF CORRECTION

PATENT NO. : 5,178,059
DATED : January 12, 1993
INVENTOR(S) : Eschlboeck, et al It is certified that error appears in the above-identified patent and that said Letters Patent is hereby corrected as shown below:

Col. 2, line 15, after "level" insert --14 of the garnishing liquid which covers the ground --.

Signed and Sealed this

Thirtieth Day of March, 1993

*Attest:*

STEPHEN G. KUNIN

*Attesting Officer*   Acting Commissioner of Patents and Trademarks